United States Patent [19]

Patel

[11] Patent Number: 5,349,002
[45] Date of Patent: Sep. 20, 1994

[54] HEAT CURABLE PRIMERLESS SILICONE HARDCOAT COMPOSITIONS, AND THERMOPLASTIC COMPOSITES

[75] Inventor: Gautam A. Patel, Clifton Park, N.Y.

[73] Assignee: General Electric Company, Schenectady, N.Y.

[21] Appl. No.: 984,612

[22] Filed: Dec. 2, 1992

[51] Int. Cl.$^5$ .............................. B32B 9/04
[52] U.S. Cl. .................. 428/412; 428/447; 524/588; 524/837; 524/858
[58] Field of Search ............ 524/837, 858, 582, 447; 428/412

[56] References Cited

U.S. PATENT DOCUMENTS

| | | | |
|---|---|---|---|
| 4,309,319 | 1/1982 | Vaughn | 524/858 |
| 4,311,763 | 1/1982 | Conroy | 428/412 |
| 4,373,060 | 2/1983 | Ching | 524/767 |
| 4,413,088 | 11/1983 | Frye | 524/858 |
| 4,486,504 | 12/1984 | Chung | 428/412 |
| 4,500,669 | 2/1985 | Ashlock et al. | 524/440 |
| 4,588,770 | 5/1986 | Wurminghausen et al. | 524/731 |
| 4,652,497 | 3/1987 | Ascarelli et al. | 524/858 |
| 4,680,232 | 7/1987 | Factor et al. | 428/412 |
| 4,914,143 | 4/1990 | Patel | 522/148 |

FOREIGN PATENT DOCUMENTS 3323911 1/1985 Fed. Rep. of Germany .

OTHER PUBLICATIONS

Publication–Tone® Polyols–Tone® Polyols for High–Performance Coatings, Adhesives, and Elastomers–Union Carbide UCAR Coatings Resins–F4959-3B–Dec. 1989–2M–pp. 1–8.

*Primary Examiner*—Ralph H. Dean
*Attorney, Agent, or Firm*—William A. Teoli; William H. Pittman

[57] ABSTRACT

A primerless silicone hardcoat composition is provided which utilizes polycaprolactone polyol as an adhesion promoter in combination with silicone hardcoat ingredients,

6 Claims, No Drawings

HEAT CURABLE PRIMERLESS SILICONE HARDCOAT COMPOSITIONS, AND THERMOPLASTIC COMPOSITES

BACKGROUND OF THE INVENTION

The present invention relates to primerless silicone hardcoat compositions comprising an aqueous/organic solvent silicone dispersion consisting essentially of colloidal silica, and a partial condensate of an organoalkoxysilane, in combination with an effective amount of an adhesion promoter in the form of a caprolactone based polyester polyol.

Prior to the present invention, as shown by Patel, U.S. Pat. No. 5,041,313, silicone hardcoat composites were made by initially priming a thermoplastic substrate, such as a polycarbonate substrate, with a solution of a polyacrylic resin in a solvent blend, followed by the application of a silicone hardcoat composition. European patent application 0439294A1 suggests that priming a thermoplastic substrate prior to the application of the silicone hardcoat is not necessary if a monomeric hydroxy acrylate such as 2-hydroxy ethyl methacrylate is added to the hardcoat mixture before it is thermally cured. However, the use of hydroxy acrylates in coating compositions has sometimes been restricted because of their toxicity, as taught in Chung, U.S. Pat. No. 4,486,504.

In copending application Ser. No. 07/880,777, filed May 11, 1992, now pending it was found that an acrylated or methacrylated polyurethane, or an acrylic polyol copolymer, having an $\overline{M}_n$ (number average molecular weight) of at least 1000 could be used as an adhesion promoter in the aqueous/organic solvent silicone dispersion. The term "aqueous/organic solvent silicone dispersion" means a dispersion consisting essentially of colloidal silica and the partial condensate of an organoalkoxysilane as defined in more detail hereinafter. The resulting silicone hardcoat compositions can be applied directly onto a variety of unprimed thermoplastic substrates, such as a polycarbonate substrate, followed by a thermal cure to provide thermoplastic composites exhibiting improved adhesion and weathering resistance.

SUMMARY OF THE INVENTION

The present invention is based on the discovery that a caprolactone based polyester polyol, such as a caprolactone based polyester diol or triol, can be used as adhesion promotors for a heat curable colloidal silica filled organopolysiloxane. The resulting heat curable organopolysiloxane composition can be used directly on an unprimed polycarbonate surface to provide an abrasion and weather resistant polycarbonate substrate. The treated polycarbonate substrate also exhibits an excellent cross hatch adhesion value after an extended period of water immersion at 65° C.

STATEMENT OF THE INVENTION

There is provided by the present invention, a heat curable primerless silicone hardcoat composition comprising by weight,
(A) 100 parts of an aqueous/organic solvent silicone dispersion having 10-50% by weight of solids and consisting essentially of 10-70% by weight of colloidal silica and 30-90% by weight of a partial condensate of an organoalkoxysilane, and
(B) 1 to 10 parts, and preferably 1 to 5 parts, of a caprolactone based polyester polyol.

Organoalkoxysilanes which can be used in the preparation of the aqueous/organic solvent dispersion of the heat curable primerless silicone hardcoat compositions of the present invention are included within the formula, $$(R)_a Si(OR^1)_{4-a} \tag{1}$$

where R is a $C_{(1-6)}$ monovalent hydrocarbon radical, and preferably a $C_{(1-4)}$ alkyl radical, $R^1$ is an R or a hydrogen radical and a is a whole number equal to 0 to 2 inclusive. Preferably, the organoalkoxysilane included within formula (1) is methyltrimethoxysilane, methyltrihydroxysilane, or a mixture thereof which can form a partial condensate.

Some of the aqueous/organic solvent dispersions of colloidal silica which can be used in the practice of the present invention are shown by Clark, U.S. Pat. No. 3,986,997 which is incorporated herein by reference. These aqueous/organic solvent dispersions can be prepared by adding a trialkoxysilane, such as methyltrimethoxysilane to a commercially available aqueous dispersion of colloidal silica such as Ludox HS of the E. I. duPont de Nemours and Company and Nalco 1034A of the Nalco Chemical Co. of Naperville, Ill., which has been treated with glacial acetic acid to adjust the pH. After the addition of the methyltrimethoxysilane, the resulting acidified dispersion is allowed to stand for about 1 hour until the pH is stabilized at about 4.5. The resulting compositions can be aged for several days to insure formation of the partial condensate of methyltrimethoxysilane and the silica methanol-water dispersion. Another source of a dispersion of colloidal silica is shown by Ubersax, U.S. Pat. No. 4,177,315 which utilizes a colloidal silica dispersion such as Ludox HS resulting from the hydrolysis of tetraethylorthosilicate by the addition of aliphatic alcohol and an acid. One of the preferred aqueous/organic solvent dispersions of colloidal silica can be made by initially mixing methyltrimethoxysilane and acetic acid thereafter adding Ludox, AS-40, the colloidal silica of the aforementioned Ubersax patent along with deionized water. The resulting mixture can then be agitated for 16 hours or more under ambient conditions during which time a suitable alcohol, such as isopropanol or butanol can be added. Additional organotrialkoxysilanes included within formula (1) are for example,
tetraethoxysilane,
ethyltriethoxysilane,
diethyldiethoxysilane,
tetramethoxysilane,
methyltrimethoxysilane, and
dimethyldimethoxysilane.

In the practice of the present invention, the heat curable primerless silicone hardcoat compositions can be made by combining the caprolactone based polyester polyol, or adhesion promoter, with the aqueous/organic solvent silicone dispersion consisting essentially of organoalkoxysilane, colloidal silica and sufficient alcohol. Additional silicone dispersions which can be used with the adhesion promoter are shown by U.S. Pat. Nos. 3,986,997, 4,624,870, 4,680,232 and 4,914,143 which are incorporated herein by reference.

UV (ultraviolet light) light absorbing agents which are described by Ashby et al, U.S. Pat. Nos. 4,278,804, 4,374,674, and 4,419,405, Frye, U.S. Pat. No. 4,299,746 and by Anthony, U.S. Pat. Nos. 4,495,360 and 4,525,426 which are incorporated herein by reference, can be incorporated. UV absorbers such as those of hydroxy benzophenone and benzotriazole serves as well as the triazine, cyanoacrylates and benzylidene malonates. Other additives such as free radical initiators, hindered amine light stabilizers, antioxidants, dye, flow modifiers and leveling agents or surface lubricants can be used. Other colloidal metal oxides can be present at up to about 10% by weight of the aqueous/organic solvent dispersion with colloidal silica and include metal oxides such as, antimony oxide, cerium oxide, aluminum oxide and titanium dioxide. Preferred UV absorbers are the ones which coreact with silanes and is less likely to volatalize during the heat cure. Preferred compounds are 4[gamma-(trimethoxysilyl)propoxy]-2,hydroxybenzophenone, 4[gamma-(triethoxysilyl)propoxy-2,hydroxybenzophenone or their mixtrures. UV absorbers can be used as 2 to 20 wt. % level.

Among the caprolactone based polyester polyols are Tone ®Polyols, which are commercially available from the Union Carbide Chemicals and Plastic Company, Inc., Danbury Conn. These polyester polyols are provided as difunctional or trifunctional materials. Typical properties are as follows:

TABLE 1

|  | Average Molecular Weight | Hydroxy No., mg KOH/g | Melting Point Range, °C. | Viscosity at 55° C., CP | Special Gravity, 55/20° C. |
| --- | --- | --- | --- | --- | --- |
| Difunctional |  |  |  |  |  |
| Tone 0200 Polyol | 530 | 212 | 30 to 40 | 88 | 1.073 |
| Tone 0201 Polyol | 530 | 212 | <0 to 40 | 65 | 1.072 |
| Tone 0210 Polyol | 830 | 133 | 35 to 45 | 167 | 1.072 |
| Tone 0221 Polyol | 1000 | 112 | 28 to 40 | 155 | 1.072 |
| Tone 2221 Polyol | 1000 | 212 | <0 to 22 | 175 | 1.072 |
| Tone 0230 Polyol | 1250 | 90 | 40 to 50 | 284 | 1.071 |
| Tone 0240 Polyol | 2000 | 56 | 45 to 55 | 635 | 1.071 |
| Tone 0240 HP Polyol | 2000 | 56 | 45 to 55 | 635 | 1.071 |
| Tone 0241 Polyol | 2000 | 56 | 43 to 55 | 444 | 1.071 |
| Tone 1240 Polyol | 2000 | 54 | 52 to 62 | 615 | 1.071 |
| Tone 2241 Polyol | 2000 | 56 | 40 to 53 | 582 | 1.071 |
| Tone 0260 Polyol | 3000 | 37 | 50 to 60 | 1490 | 1.070 |
| Tone 3260 Polyol | 3000 | 37 | 53 to 64 | 1241 | 1.070 |
| Trifunctional |  |  |  |  |  |
| Tone 0301 Polyol | 300 | 560 | <0 | 225 | 1.084 |
| Tone 1303 Polyol | 425 | 396 | <0 | 200 | 1.078 |
| Tone 0305 Polyol | 540 | 312 | 15 to 20 | 200 | 1.072 |
| Tone 0310 Polyol | 900 | 187 | 27 to 32 | 270 | 1.073 |

All Tone Polyols have a mxaimum acid number of 0.25 mg KOH/g polyol, a maximum water content of 0.03%, and a maximum melt color of 100 on the platinum-cobalt scale.

Although the caprolactone based polyester polyols are preferred, additional polyester polyols which are within the scope of the present invention as adhesion promoters are urethane modified and silicone modified polyester polyols.

Organic solvents which can be used to make the aqueous/organic solvent silicone dispersion are preferably $C_{(1-4)}$ alkanol, such as methanol, ethanol, propanol, isopropanol, butanol; glycols and glycol ethers, such as propyleneglycolmethyl ether and mixtures thereof.

The silicone hardcoat compositions can be catalyzed with a tetrabutylammonium carboxylate catalyst, such as tetra-n-butylammonium acetate (TBAA) and tetra-n-butylammonium formate to reduce the top coat cure time as shown in U.S. Pat. No. 4,863,520 which is incorporated herein by reference.

Thermoplastic substrates which can be used in the practice of the present invention to make silicone hardcoat-aromatic thermoplastic substrate composites are preferably aromatic polycarbonates, such as Lexan polycarbonate of the General Electric Company. In addition, other aromatic thermoplastic substrates also can be used, such as blends of polyphenylene ether and polystyrene, polyetherimides, polyesters and polysulfones.

The coating composition can be applied onto the aromatic thermoplastic substrate by anyone of the well known methods such as spraying, dipping, roll coating and the like. It can be cured thermally at 130° C. for 30 to 90 minutes, or by the use of infrared or microwave energy.

Composites made in accordance with the present invention can be used in applications, such as windshields, lamp envelopes and safety glasses.

In order that those skilled in the art will be better able to practice the present invention, the following example are given by way of illustration and not by way of limitation. All parts are by weight.

EXAMPLE

An aqueous/organic solvent silicone dispersion was prepared as follows:

There was mixed 203 grams of methyltrimethoxysilane with 1.25 grams of glacial acetic acid. There was added 41.5 grams of deionized water to 125.5 grams of Ludox AS (ammonium-stabilized colloidal silica sol, 40% $SiO_2$ having a silica particle diameter of about 22 millimicrons and a pH of 9.2) to reduce the $SiO_2$ level to 30 weight percent. The diluted silica sol was then added to the acidified methyltrimethoxysilane with stirring. The resulting solution was then stirred for another 16–18 hours at room temperature followed by the addition of 370 grams of a 1:1 (by weight) isopropanol/n-butanol solvent blend and 36 grams of 53% solution of 4-[gamma(methoxy/ethoxy) silyl/propoxy]-2,hydroxy benzophenone in methanol. The mixture was then stirred for about 2 weeks at room temperature. The composition as formulated had 20% by weight solids, and contained 11% by weight of the UV absorber, based on calculated solids. The composition had a viscosity of about 5 centistokes at room temperature. The resin was mixed with 0.2% of tetra-n-butyl ammonium acetate (TBAA) catalyst and 0.4% of a silicone based leveling agent.

Primerless silicone hardcoat formulations were prepared by mixing the above aqueous silicone dispersion with several caprolactone based polyester polyols with concentrations in the range of from 0.5 to 5 parts of adhesion promoting polyol, 100 parts of aqueous silicone dispersion. There was employed caprolactone based polyester diols and triols in the form of Tone polyols from Union Carbide Chemicals and Plastics Company.

Lexan polycarbonate panels (4"×6"×="d) were flow coated with the silicone hardcoat compositions containing the adhesion promoters. The resulting treated panels were then air dried for about 20 minutes under ambient conditions and then cured in an air circulated oven for 60 minutes at 130° C. Optically clear coatings were obtained having a thickness of 4 to 6 microns.

The resulting silicone hardcoat-polycarbonate composites were then evaluated for scribed or crosshatch adhesion failure, crazing, and microcracking after water immersion from 1 to more than 30 days at 65° C. A cross cut pattern of 100 1 mm squares were scribed onto the treated hardcoat surface. Tape adhesion was checked with a 3M-610 tape according to ASTM D3359-83. The coated samples were immersed in a hot water bath at 65° C. and checked periodically. Complete or partial removal of coating along the scribed edges or any 1 mm size square is considered a failure. The following results were obtained where "PhR" means parts per 100 parts of resin solids:

TABLE 2

| Water Immersion Test at 65° C. Cross-Hatch Adhesion[1] Evaluation | | |
|---|---|---|
| Polycaprolactone Polyol Adhesion Promoter | Amount, PhR | Cross-Hatch Adhesion Failure Time, No. of Days |
| (1) Tone 0200, diol | 2.5 | 6 |
| M.W. 530, OH-No[2].212 | 5 | >30 |
| (2) Tone 0301, triol | 2.5 | 6 |
| M.W. 300, OH-No.560 | 5 | 11 |
| (3) Tone 0310, triol | 2.5 | 11 |
| M.W. 900, OH-No.187 | 5 | >30 |
| (4) None, control | — | 0, failed initial adhesion |

[1]Cross cut pattern of 100 squares of 1 mm × 1 mm size. Tape adhesion checked with a 3M-610 tape according to ASTM D3359-83. Removal of any square partially or otherwise considered a failure.
[2]Defined as mg · KOH/g. supplied by Union Carbide Chemicals and Plastics Company, Inc., Bulletin F-49593B, Tone polyols for high performance coatings, adhesives and elastomers. Diols Tone 0230 (OH-NO.90) and Tome 0260 (M.W. 3000, OH-No.37) were insoluble in the aqueous silicone dispersion.

As shown in Table 2, the polycaprolactone diol and triols significantly improve the adhesion even after exposure to water at 65° C. for 30 days. The effective concentration and molecular weight is also shown. In addition to no adhesion failure after 30 days in water immersion at 65° C. The polycaprolactone triol adhesion promoter at 3.7 wt % in the aqueous silicone dispersion and 0.1% TBAA catalyyst showed no adhesion failure after 2100 hours of exposure in a QUV accelerated weatherometer where the coating was subjected to moisture, ultraviolet light and thermal cycling. A coating containing 3.7% polycaprolactone triol, 0.1% TBAA condensation catalyst and 1% hexamethoxymethylmelamine resin (Cymet 303, American Cyanamid Co.) showed no adhesion loss after 30 days of water immersion at 65° C.

Although the above example is directed to only a few of the very many variables which can be used in making the primerless silicone hardcoat compositions of the present invention, there is provided by the present invention, a much broader variety of primerless silicone hardcoat compositions as shown in the description preceding this example.

What is claimed is:

1. A heat curable primerless silicone hardcoat composition comprising by weight,
   (A) 100 parts of an aqueous/organic solvent dispersion having 10–50% by weight of solids and consisting essentially of 10–70% by weight of colloidal silica and 30–90% by weight of a partial condensate of an organoalkoxysilane, and
   (B) 1 to 10 parts of an adhesion promoter consisting essentially of a caprolactone based polyester polyol.

2. A heat curable primerless silicone hardcoat composition in accordance with claim 1, where the organoalkoxysilane is methyltrimethoxysilane.

3. A heat curable primerless silicone hardcoat composition in accordance with claim 1 where the adhesion promoter is a polycaprolactone diol.

4. A heat curable primerless silicone hardcoat composition in accordance with claim 1, where the adhesion promoter is a polycaprolactone triol.

5. A composite of a thermoplastic sheet having a cured coating resulting from the thermal cure of a heat curable primerless silicone hardcoat composition comprising by weight,
   (A) 100 parts of an aqueous/organic solvent dispersion having 10 ∝ 50% by weight of solids and consisting essentially of 10–70% by weight of colloidal silica and 30–90% by weight of a partial condensate of an organoalkoxysilane, and
   (B) 1 to 10 parts of an adhesion promoter consisting essentially of a caprolactone based polyester polyol.

6. A composite in accordance with claim 5, where the thermoplastic sheet is a polycarbonate.

* * * * *